US008903996B2

(12) United States Patent
Akelbein et al.

(10) Patent No.: US 8,903,996 B2
(45) Date of Patent: *Dec. 2, 2014

(54) OPERATING CLOUD COMPUTING SERVICES AND CLOUD COMPUTING INFORMATION SYSTEM

(75) Inventors: Jens-Peter Akelbein, Nackenheim (DE); Nils Haustein, Soergenloch (DE); Wolfgang Mueller-Friedt, Meisenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,261

(22) Filed: Aug. 9, 2012

(65) Prior Publication Data

US 2012/0303807 A1    Nov. 29, 2012

Related U.S. Application Data

(63) Continuation of application No. 13/497,515, filed as application No. PCT/EP2010/064894 on Oct. 6, 2010.

(30) Foreign Application Priority Data

Dec. 15, 2009 (EP) .................................... 09179306

(51) Int. Cl.
*G06F 15/173* (2006.01)
*G06F 11/30* (2006.01)
*G06Q 10/06* (2012.01)

(52) U.S. Cl.
CPC ........ *G06F 11/3006* (2013.01); *G06F 11/3055* (2013.01); *G06Q 10/06* (2013.01); *G06F 11/3051* (2013.01)
USPC ........... 709/224; 709/223; 709/225; 709/226; 709/211

(58) Field of Classification Search
CPC ..... H04L 43/04; H04L 47/822; H04L 63/102; H04L 41/085; H04L 41/0853; H04L 67/16; H04L 67/32

USPC .......................... 709/211, 223, 224, 225, 226
See application file for complete search history.

(56) References Cited

U.S. PATENT DOCUMENTS 7,237,239 B1 *  6/2007 Goel et al. .................... 717/170
7,447,783 B2    11/2008 Kutaragi et al.
(Continued)

FOREIGN PATENT DOCUMENTS

EP        2090983 A1    8/2009
WO    2008151925 A2   12/2008

OTHER PUBLICATIONS

PCT/EP2010/064894, International Search Report and Written Opinion, Jan. 5, 2011.
Buyya, R., "Market-Oriented Cloud Computing: Vision, Hype and Reality for Delivering IT Services as Computing Utilities." International Conference on IEEE Piscataway, N.J., Sep. 25, 2008.

(Continued)

*Primary Examiner* — Dustin Nguyen
*Assistant Examiner* — Hao Nguyen
(74) *Attorney, Agent, or Firm* — Kunzler Law Group, PC; Steven L. Bennett (57) ABSTRACT

A cloud computing information system includes a first collection unit that collects node status information from a cloud computing node, a second collection unit that collects cloud service status information indicative of an attribute of a cloud computing service being executed in the cloud computing node, a third collection unit that collects environmental data sets from a plurality of computing systems where each data set corresponds to attribute values of one of the computing systems, a group building unit that builds a group of computing systems, where the group includes computing systems of the plurality of computing systems with an identical attribute value, a storage unit that stores the node and cloud service status information, environmental data sets, and the identical attribute value, and a selection unit that selects characteristic data from the node and cloud service status information and environmental data sets and sends it to a computing system.

7 Claims, 3 Drawing Sheets

(56) References Cited

U.S. PATENT DOCUMENTS

| | | | |
|---|---|---|---|
| 8,688,797 B2* | 4/2014 | Hesselink et al. | 709/211 |
| 2003/0105810 A1 | 6/2003 | McCrory et al. | |
| 2008/0082480 A1* | 4/2008 | Gounares et al. | 707/2 |
| 2009/0182955 A1 | 7/2009 | Cherukuri | |
| 2010/0305990 A1* | 12/2010 | Tyree et al. | 705/7 |
| 2012/0198057 A1* | 8/2012 | Ennis et al. | 709/224 |
| 2013/0179565 A1* | 7/2013 | Hart et al. | 709/224 |

OTHER PUBLICATIONS

Gupta, R., et al. "Multi-dimensional Knowledge Integration for Efficient Incident Management in a Services Cloud," International Conference on Services Computing. Piscataway, NJ., Sep. 21, 2009.

Lijun, Mei, et al., "A Tale of Clouds: Paradigm Comparisons and Some Thoughts on Research Issues." IEEE Asia-Pacific Services Computing Conference, Taiwan, Dec. 9, 2008.

* cited by examiner

OPERATING CLOUD COMPUTING SERVICES AND CLOUD COMPUTING INFORMATION SYSTEM

CROSS-REFERENCE TO RELATED APPLICATIONS

This application is a continuation U.S. patent application Ser. No. 13/497,515 entitled "METHOD FOR OPERATING CLOUD COMPUTING SERVICES AND CLOUD COMPUTING INFORMATION SYSTEM" and filed on Mar. 21, 2012 for Jens-Peter Akelbein, et al. which was the National Stage of International Application No. PCT/EP2010/064894, filed Oct. 6, 2010 for International Business Machines Corporation, which claims priority to European Patent Application No. EP09179306 filed on Dec. 15, 2009 for International Business Machines Corporation, the entire contents of the above mentioned applications are incorporated herein by reference for all purposes.

BACKGROUND

1. Field

The invention relates to a method for operating cloud computing services in a cloud computing network as well as a cloud computing information system.

2. Description of the Related Art

Recently, cloud computing has become a new computing paradigm. A generally accepted definition of cloud computing and cloud computing services can be described as follows: Cloud computing services may be defined as consumer and business products, services and solutions delivered and consumed in real-time over the Internet. Typically, cloud services are offered as shared services under a virtualised management and accessible over the Internet by people and/or other services via Internet standards. Additionally, cloud services delivered as consumer and/or business products meet the following key attributes: the services are shared meaning that there is a one-to-many relationship. The services are built for a market of consumers and not just a single customer, irrespective of his nature as a private or business customer. Secondly, the solutions are packaged meaning that they are turn-key offerings integrating required resources. Thirdly, they are accessible via the Internet, meaning that they can be accessed by a ubiquitous, but authorized network access. Fourthly, the cloud services comprise the concept of self-service provisioning, meaning that in many—if not in most—cases an intuitive, not hard to handle user interface is available in order to consume the cloud computing services. Fifthly, cloud computing services are dynamic and fine-grained or "elastic" meaning that the service provisioning scales with the number of users accessing the cloud services. Sixthly, the concept of cloud computing relies on a user-based and/or user-oriented pricing model, meaning that a utilization and cost tracking is provided based on individual usage. Seventhly, cloud computing services are using a standard-based user interface, meaning that typically a Web browser or a successor may be used for accessing the cloud services. Lastly, cloud services provide published program and/or services interfaces, meaning that they are mainly based on Web services application programming interfaces (API).

Cloud computing systems provide computing, data, and application services of different kind: public cloud computing systems and private cloud computing systems.

A public cloud computing system is operated by a provider which offers cloud computing services to consumer or business users. A trivial cloud computing service can be a plain computing system or data processing system with an operating system. The consumer—either an individual, private user or a business user—may use this computing system to install his own application and use it. Another cloud computing service may be a Web-service, where the cloud computing service provider provides a computer with an operating system and Web-server software installed which the consumer may use. Yet another example for a cloud computing service is a storage service, wherein the cloud computing service provider provides a storage system accessible via the Internet or a dedicated network line by the consumer with one or multiple interface protocols such as NFS, CIFS, FTP, HTTP, and WebDAV, which the consumer may use to store data. Even complex services—like a customer relationship management system—composed of multiple applications providing one or more interfaces may be seen as a service provided out of a cloud computing environment.

In contrast to a public cloud computing system, a private cloud computing system is designed for and access-restricted to a single enterprise or a so-called extended enterprise, which includes also partner enterprises. In a private cloud computing system, there are internally shared resources in form of cloud computing services and not a commercial offering to the public market.

Thus, the concept of cloud computing systems relies on the Internet or connectivity via the same Internet protocols being used via dedicated lines. Typical cloud computing systems comprise cloud computing nodes providing cloud computing services, cloud computing networks, consumer interfaces, one or more external networks, via which the consumer workstation may be connected to cloud computing nodes in the form of data processing systems, or simply "to the cloud", and monitoring and management components.

Cloud computing nodes are essentially computing systems or data processing systems, which are configured with software programs such as an operating system and applications providing cloud computing services. Cloud computing services are typically represented by software. Cloud computing nodes may also comprise data storage systems, which may be included in the cloud node or which may be externally attached to one or more cloud computing nodes, e.g., via a storage area network (SAN).

Cloud computing networks may be used to connect cloud computing nodes among each other for internal cloud processing. Cloud computing networks are closed networks within the cloud system and not visible to the consumer. Cloud computing networks may, for example, be based on Ethernet or fibre channel. A plurality of cloud computing networks may exist in a cloud computing system. Consumer interfaces may be interfaces over which the consumer can access the cloud services. An interface may be a protocol, which runs on a certain hardware. There are different types of interfaces, which are determined by the cloud service provided by the cloud computing node. For example, a cloud computing node, which provides a Web-server service for a Web-services interface may be based on Ethernet and TCP/IP.

Another cloud computing node may provide a plain operating system with an interface based on SSH via Ethernet or TCP/IP. External networks are used by computing systems of the consumer—either private or within an enterprise—to access the cloud computing services via the consumer interface. External networks do not have access to internal networks. The consumer of cloud computing services may access the cloud computing services and/or applications via a Web browser or another application via an API. An example of a Web-browser delivered cloud computing service would be a geographic routing service. Access via a non-visual software component is also possible.

By using virtualization technologies, a cloud computing node represented as hardware may contain a large number of virtualized data processing systems. Larger cloud computing networks may consist of hundreds of thousands of virtualized nodes running on tens of thousands of physical cloud computing nodes in the form of data processing systems. In principle, the size of a cloud, or a cloud computing network, is not limited.

Monitoring and management components are available to obtain the software levels of operating systems and applications in addition to the hardware and firmware levels and details for each cloud computing node and store these in a database typically called configuration management database (CMDB). Furthermore, monitoring systems comprise methods to collect status and error information for each cloud node building the hardware and software stack. Management components allow monitoring, operating and changing of a configuration of individual cloud computing nodes in cloud computing network or networks.

Hardware and software components building up a hardware and software stack can change for various reasons like introducing, maintaining, increasing, decreasing, and removing services and resources. Such a stack may consist of multiple components leading to a very high number of possible configurations kept in the CMDB.

If in a business-to-business (B2B) environment cloud computing services are used, they are either used by individual end users of the enterprise or by the IT department of the enterprise. In contrast to individual consumers, enterprises are defining security policies on confidentiality of their business data, their IT business processes, their statistical data like utilization of their IT applications and services, their hardware and software being used, and all information of the enterprise itself. Even in this case, there will be a mixture of classical IT operations that deploy hardware and software systems inside an enterprise by its own IT centre and externally provided cloud computing services by a cloud computing provider. By moving applications or parts thereof into a public or private cloud, enterprises may take advantage by changing their related security policies on such information and data.

Based on the above, there may be a need for improving knowledge about cloud computing services configurations, hardware and software stack configurations, experiences made with cloud computing systems and other framing parameters related to cloud computing systems.

BRIEF SUMMARY

This need may be addressed by a method for operating cloud computing services in a cloud computing network, a cloud computing information system for operating cloud computing services in a cloud computing network, and a related data processing program and a related computer program product.

According to a first aspect there is provided a method for operating cloud computing services in a cloud computing network comprising collecting node status information, indicative of a configuration of a cloud computing node, from the cloud computing node, wherein the cloud computing node is connected to the cloud computing network; collecting cloud computing service status information indicative of an attribute of a cloud computing service being executed in the cloud computing node; collecting environmental data sets from a plurality of computing systems, each environmental data set corresponding to attribute values of one of the plurality of computing systems, wherein the computing systems are connected to a network which is connected to the cloud computing network; building a group of computing systems, wherein the group consists of computing systems of the plurality of computing systems with at least one identical attribute value; storing the node status information, the cloud service status information, the environmental data sets, and the identical attribute value of each computing system of the group in a database; and responsive to a request for characteristic data requested from one computing system of the same group, selecting the respective characteristic data out of the node status information, the cloud service status information and the environmental data sets in the database and sending the respective characteristic data over the cloud computing network and the network to the one computing system of the plurality of computing systems having requested the characteristic data.

According to another aspect a cloud computing information system for operating cloud computing services in a cloud computing network is provided, the cloud computing information system comprising a first collection unit adapted for collecting node status information, indicative of a configuration of a cloud computing node, from the cloud computing node, wherein the cloud computing node is connected to the cloud computing network; a second collection unit adapted for collecting cloud service status information indicative of an attribute of a cloud computing service being executed in the cloud computing node; a third collection unit adapted for collecting environmental data sets from a plurality of computing systems, each environmental data set corresponding to attribute values of one of the plurality of computing systems, wherein the computing systems are connected to a network which is connected to the cloud computing network; a group building unit adapted for building a group of computing systems, wherein the group consists of computing systems of the plurality of computing systems with at least one identical attribute value; a storage unit adapted for storing the node status information, the cloud service status information, the environmental data sets, and the identical attribute value of the group in a database; a selection unit adapted for selecting characteristic data out of the node status information, the cloud service status information and the environmental data sets in the database and sending the characteristic data over the cloud computing network and the network to the one computing system of the plurality of computing systems having requested the characteristic data, in response to a request for characteristic data from one computing system of the group.

In the context of this application the following expression conventions are used:

Cloud computing nodes may essentially be computing systems, which are configured with software programs such as operating systems, middleware and application programs providing cloud computing services. Cloud computing nodes may also comprise data storage systems, which may be included in the cloud computing node or which may be attached externally to the cloud computing node via, e.g., a storage area network (SAN).

Cloud computing services may denote services being provided by a cloud computing node. Cloud computing services are typically represented by software. Cloud computing services may relate to one or more of the "as-a-Service"-concept, like Software-as-a-Service (SaaS), Platform-as-a-Service (PaaS), Storage-as-a-Service (StaaS) or Infrastructure-as-a-Service (IaaS).

A cloud computing network may denote two or more cloud computing nodes being connected by a network. Such a network may typically be based on the Ethernet protocol. Other network topologies or protocols are also possible. A cloud computing network may also be provided by a single cloud computing node.

A consumer of a cloud computing service may denote an end user as employee or otherwise related to an enterprise or an individual user like a private user or a user from a small business. Consumers access cloud computing services via consumer interfaces. Consumer interfaces may denote interfaces over which the consumer may access a cloud computing service. An interface may be a protocol, which runs on a certain hardware. There are different types of interfaces, which are determined by the cloud computing service provider for the cloud node. For example, a cloud computing node, which may provide a Web-server service, has a Web-services interface based on Ethernet protocols and TCP/IP.

Node status information may denote any information about a configuration of a cloud computing node. This may include information about capacity, I/O-sub-system, the complete software stack including the operating system, middleware and applications, the usage of the cloud computing node, an error log, information about the location of the cloud computing node and the associated data, information about the owner of the data of the cloud computing node and/or access statistics about the cloud computing node.

Cloud service status information may denote one or more attributes of a cloud computing service that is executed in one cloud computing node. Such cloud service status information may comprise all available information and data about a cloud service, e.g., the capability of a cloud computing service, a version number, an identifier of the cloud computing service, usage data about the cloud service and potential error log data, information about the service provider of the cloud computing service, a cloud computing service price, and/or an enterprise identifier denoting an enterprise, which computing system accesses a specific cloud service.

An environmental data set may denote one or more attribute values of computing systems or a larger group of computing systems within a computing centre of an enterprise, which is connected via a network, e.g., the Internet, to the cloud computing network. A hardware interface between the network to which the computing system is linked, and the cloud computing network may be provided. The attribute values may comprise information about the individual computing system accessing the cloud computing node in the cloud computing network and consuming cloud computing services but also a series of information about the cloud computing technical environment itself. This may also include information about the company operating the computing system or the industry or sub-industry of the enterprise operating the computing system, specifically used technical processes for operating a computing environment or an IT centre within the enterprise or other relevant data that may be of interest to other enterprises. This information may also comprise total revenue of an enterprise, number of employees of the enterprise, number of employees in the IT centre of the enterprise, or other key parameters of the enterprise operating the computing system.

A request for characteristic data may denote a computer command sent from one computing system of the plurality of computing systems via the network and via the cloud computing network to one of the cloud computing nodes requesting specified data about a cloud computing node in the form of node status information, a service in form of cloud service status information or a subset of cloud service status information of one service or a collection of cloud service status information from several cloud computing services. The request may also aim for having data returned from a cloud computing information system having stored environmental data sets as described above. Once the data have been identified as requested, the data are sent via the cloud computing network and the network to the requesting computing system of the plurality of computing systems. The request may be based on an individual end user input or on a program running either on one of the computing systems in the computing centre of an enterprise operating the one computing system of the plurality of computing systems.

An advantage of the method for operating cloud computing services and a cloud computing network may be in sharing information among a group of computing systems and its users about services consumed from the cloud computing network and also in sharing information about the computing system and its environment itself. This way, interest groups may be formed among enterprises belonging to the same vertical industry, e.g., the chemical industry, the automotive industry, the retail industry, the healthcare industry, or public services organizations.

In the following, further exemplary embodiments of the method for operating cloud computing services in a cloud computing network will be described. However, these embodiments also apply for the inventive cloud computing information system for operating cloud computing services in a cloud computing network.

In one embodiment the node status information may comprise one of the group consisting of node software stack data, node hardware configuration data, node usage data, node error log, node location data, and node access statistics data. In particular, any combination of individual node status information data may be possible. The node status information may comprise, in particular, all data that is collected and managed about the operation of a computing system in form of a cloud computing node, by a systems management tool. The node hardware configuration data may comprise the manufacturer name of the computer, an internal memory capacity, an external or bulk memory capacity, peripheral devices being attached to the computer, and/or the age of the computing system. The node software stack data may denote cloud computing node information about the software being installed on the cloud computing node hardware. This may comprise a description and/or a name of an operating system, version and release numbers as well as patch information, information about middleware like databases or application servers, network software, programming environments and other utility programs commonly known as middleware. Additionally, the node software stack data may comprise information about application software and interfaces for any of the installed components of the software stack. The node status information may also comprise information about any virtualization layers on the cloud computing node. Node usage data may comprise information about the usage of an individual cloud computing node in the form of actual capacity over time compared to the total capacity of the computing system of the cloud computing node.

Node error log information may denote any information about past errors that happened to the hardware configuration or to the node software stack. A node location information or node location data may denote physical location of a cloud computing node. This may include country information and/or other geographic information like a physical address in a city.

Node owner data or node owner information may comprise information about the provider of the cloud computing node.

Node access statistic data may comprise information about an access to the cloud computing node over time.

In particular, a combination of more than one or even all of the parameters relating to node status information may actually be used in an embodiment.

In another embodiment, the cloud computing service status information may comprise one of the group consisting of a cloud service identifier, a cloud service version, a cloud service capability, cloud service usage data, cloud service error log data, cloud service provider identification and context information, cloud service price, and an enterprise identifier, wherein the enterprise identifier corresponds to a computing system of the plurality of computing systems. In particular, the cloud service status information may also be a combination of any attributes listed above.

This may deliver the cloud computing service provider as well as consumers or users of cloud computing services detailed information about a cloud service being provided. In particular, a computing system representing an access by an end user of an enterprise via a network and via the cloud computing network to an individual cloud computing service may be provided with a wide variety of information about a specific cloud computing service. An end user accessing this information by the computing system of the plurality of computing systems may decide whether a specific cloud computing service may be of any help to his enterprise.

In yet another embodiment one individual environmental data set or more generally, the environmental data sets may comprise at least one attribute out of the group consisting of an enterprise identifier, a country identifier, a virtual industry identifier, a business unit identifier, the number of employees of the enterprise running the computing system, revenue of the enterprise, number of business transactions, organizational structure, storage I/O-throughput, number of transaction on databases, number of end users, CPU utilization, storage consumption, error log information, attributes of processes used, hardware configurations, firmware levels, software configurations, and process templates. In particular, the environmental data sets may not just comprise one attribute but any combination out of the attributes listed above.

Such set of information could be used to describe large parts of the computing environment of a particular enterprise as well as other characteristic data of an enterprise like revenue and number of employees. Access to any of these attribute values may be restricted in such a way, that access to these attribute values might be given to users of other computing systems belonging to the same group. This way, interest groups, for example, of enterprises belonging to the same vertical industry, may be formed. It may also be possible to form interest groups using a specific application program. If, in particular, also marketing data, sales information like revenue data, information about research and development, information about an enterprise's service and support organization are accessible by members of a group, joint interests may be followed, providing a potential competitive advantage over other enterprises not allowing access of a cloud computing information system to their data.

According to another embodiment, the method may further comprise, responsive to a generate-new-service-request from one computing system belonging to the group, delivering of decision support data indicative of a best match between attributes of existing cloud computing services being executed in a cloud computing node of a cloud computing network and attributes of a new service being specified by the generate-new-service-request, wherein the existing cloud computing service is used by a computing system of the group.

In other words, a user of a computing system of the plurality of computing systems of the group may inform himself about existing cloud services being available in the cloud computing network. He may specify a new service that may be consumed by the computing system of the enterprise of the user. Based on these specification data, wherein specific attributes of a new cloud computing service are given individual values, a cloud information system of the cloud computing network may send information about cloud services that already are executed or available on one of the cloud computing nodes matching the attribute values. In particular, cloud computing services used by the group may be given a priority.

If no direct or complete match may have been found within the group, the cloud computing information system may, in particular, determine a match with an existing cloud computing service from another group. If also there no direct or complete match may have been found the cloud computing information system may determine a best match between the specified attributes of a new cloud computing service and all available cloud computing services.

A best match may be determined by a highest number of identical attribute values between the specified attribute values and those of available cloud computing services. The cloud information system may inform the consumer about differences and list several potential available cloud computing services that come closest to the specified attributes. Other matching priorities may be defined.

In an alternative embodiment of the method for operating cloud computing services in a cloud computing network, the method may further comprise, responsive to a generate-new-service-request from one computing system, automatically generating a new cloud computing service to be performed in the cloud computing node based on the cloud service status information in the database and attributes of the new service being specified by the generate-new-service-request. In particular, the new service may be generated based on an existing cloud computing service already used by another computing system of the group.

If no match may be found also cloud computing services from another group may be used as a basis. Such a mechanism may decrease dramatically the time for setting up and configuring new cloud services because an identical, equivalent, or similar cloud service request may have been generated previously from another computing system of the plurality of computing systems representing another enterprise belonging to the same group.

It should be noted that the group, wherein each individual computing system may belong to another enterprise, may also define a group of enterprises belonging to the same group. In this sense the computing systems and the enterprises may be used in an exchangeable manner.

In alternative embodiment of the method for operating cloud computing services, the method may further comprise determining a number of cloud computing nodes executing a predefined version of a predefined software component, specified in the node software stack configuration data, as part of a cloud computing service for a computing system of the group. In particular, the determined number, or a related percentage value, may be sent on request to the computing systems of the group. The number may, in particular, be sent to the computing systems of the group if a trigger level is exceeded. This trigger level may have been set by a computing system of the group. This enables a user of the computing system to monitor whether a certain software version is used by a minority or majority of the user of the group.

In yet another embodiment of the method for operating cloud computing services, the method may further comprise, if the number exceeds a specified trigger level and if an actual version of the predefined software component is lower than the predefined version, installing the predefined version of the predefined software component on a cloud computing node, executing a cloud computing service for the computing system of the group for which the specified trigger level is defined. This allows a user of the group to set a trigger level in a way to ensure that the predefined software component is also used for the cloud computing service he is using. A user of a computing system being careful may only use the next version of a software component if a majority of, e.g., 70% is already using it. A more progressive user of the computing system may decide to use the software component if only 30% of his peers are using it.

In another exemplary embodiment of the cloud computing information system for operating cloud computing services in a cloud computing network, the cloud computing information system may comprise additionally a user interface at one of the plurality of computing systems adopted for allowing a user action out of the group consisting of joining the group, deciding on sharing parts of the one of the individual data sets corresponding to attribute values of the one computing system of the plurality of computing systems, introducing a process of a process template library, utilizing a process of a process template library, modifying the process of a process template library, searching through group attributes, sorting and displaying of the group and group attributes values based on user defined criteria.

An advantage of such an embodiment of the cloud computing information system may be that a user or consumer being represented by one computing system of the plurality of computing systems may inform himself about the computing context of peers in his group, provided that the peers have granted access to the related information attribute values. Such a mechanism may provide even better support for exchanging information for building joined interest groups across enterprise borders.

It should be noted that the invention may take the form of an entirely hardware implementation, and entirely software embodiment or embodiment containing both, hardware and software elements. In a preferred embodiment, the invention is implemented in software which includes, but is not limited to, firmware, resident software and microcode.

In one embodiment, a data processing program for execution in a data processing system is provided comprising software code portions for performing the method as described above when the program is run on a computer.

Furthermore, the invention may take the form of a computer program product accessible from a computer-usable or computer-readable medium providing program code for use by or in connection with a computer or any instruction execution system. For the purpose of this document, a computer-usable or computer-readable medium can be any apparatus that may contain, store, communicate, propagate, or transport the program for use by or in a connection with the instruction execution system, apparatus, or device.

In another embodiment, a computer program product stored on a computer usable medium is provided, comprising computer readable program means for causing a computer to perform the method, as described above, when the program is run on the computer.

The medium may be an electronic, magnetic, optical, electromagnetic, infrared or a semi-conductor system for a propagation medium. Examples of a computer-readable medium include a semi-conductor or solid state memory, magnetic tape, a removable computer diskette, a random access memory (RAM), a read-only memory (ROM), a rigid magnetic disc and an optical disc. Current examples of optical discs include compact disc-read only memory (CD-ROM), compact disc-read/write (CD-R/W), DVD and Blue-Ray-Disc.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of present invention are apparent from the examples of embodiment to be described hereinafter and are explained with reference to the examples of embodiment. The invention will now be described in more detail with reference to examples of embodiment, but to which the invention is not limited.

BRIEF DESCRIPTION OF THE DRAWINGS

Preferred embodiments of the invention will now be described, by way of example only, and with reference to the following drawings.

DETAILED DESCRIPTION

In the following a detailed description of the drawings will be given. All illustrations in the drawings are schematic. Firstly, a conventional computing system will be described. Afterwards, the inventive method for operating cloud computing services in a cloud computing network with a cloud computing information system will be described.

Figure 3:
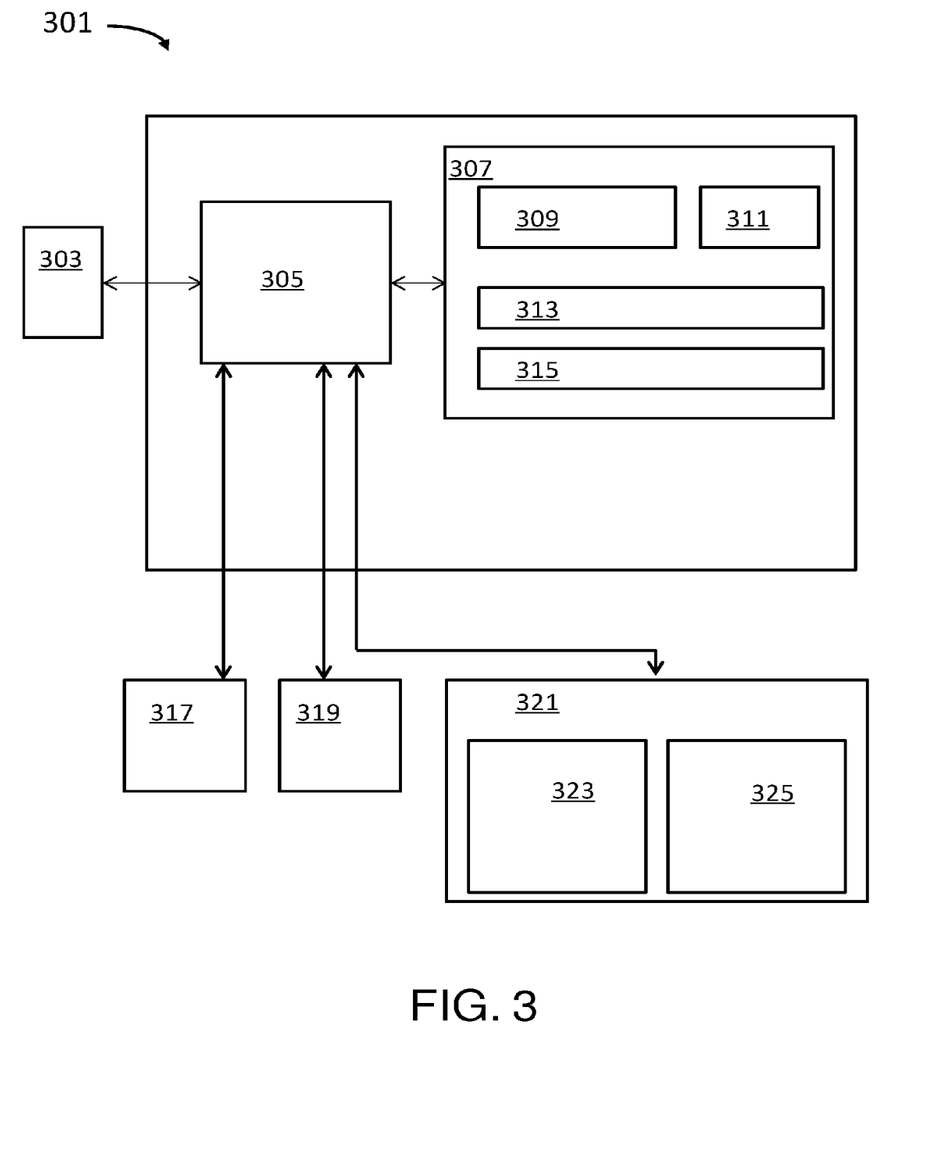
FIG. 3 illustrates a conventional computer system.

FIG. 3 shows a conventional data processing system 301 suitable for storing and/or executing program code. Each of the computers 109 may have an architecture like the data processing system 301. The same applies to cloud computing nodes. The data processing system 301 includes at least one processor 305, coupled directly or indirectly to memory elements 307 through a system bus. The memory elements 307 may include main memory 309 employed during actual execution of the program code, cache memory 311, and bulk or mass storage 321, which provide temporary storage of at least some program code in order to reduce the number of times code must be retrieved from bulk storage 321 for an execution. It should be noted that the processor may have one central processing unit (CPU) 305 or a plurality of CPUs working in parallel. Each CPU may also comprise multiple CPU cores. Additionally, a user input device 303, a network interface 317 and a display 319 may be provided. The mass or bulk storage 321 may contain storage areas for an operating system, middleware and applications as referred to by reference numeral 323 and/or to program related data 325. Reference numerals 313 and 315 may denote specific programs that are at least in parts stored in main memory 307 for execution by the one or more processors 305. The network interface 317 may enable the data processing system or computer to become coupled to other data processing systems or remote printers or storage devices through intervening private or public networks. Modems, cable modems, Ethernet cards are just a few of the currently available types of network adapters.

Figure 1:
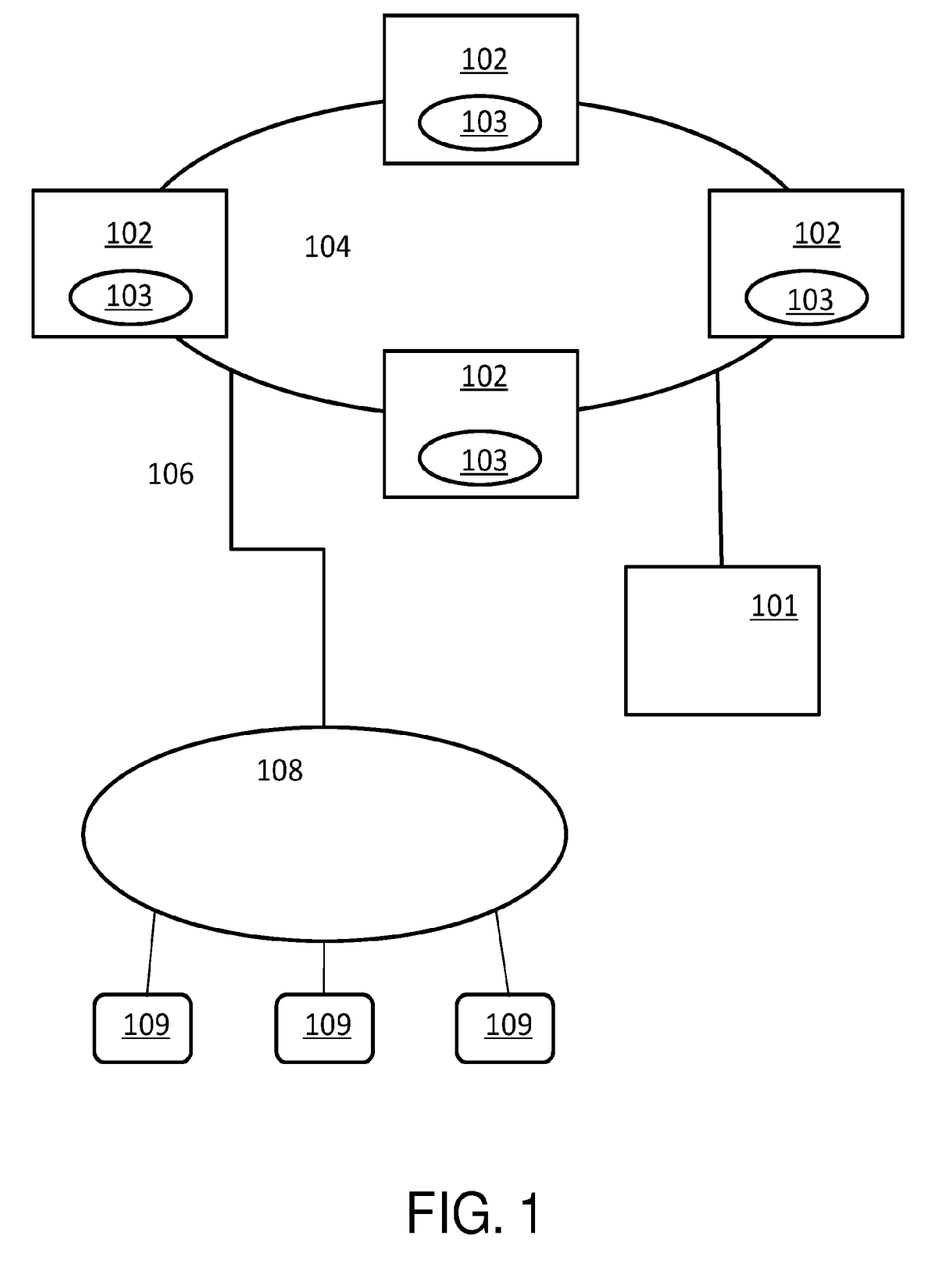
FIG. 1 illustrates a block diagram of a cloud computing network with an attached network to which computing systems are attached.

FIG. 1 illustrates a cloud computing network 104 with an attached cloud computing information system 101. Cloud computing nodes 102 are attached to the cloud computing network 104. In or on each of the cloud computing nodes 102, cloud computing services 103 are executed or run. Each cloud computing node 102 may be composed of a plurality of virtual machines. Additionally, a cloud computing service might be executed by a cloud computing node, or by a virtual machine that runs on a physical cloud computing node 102. Attached to the cloud computing network 104 is an interface 106 between the cloud computing network 104 and another network 108. In case the cloud computing network 104 is operated as a public cloud then the network 108 may typically be the Internet. Attached to the network 108 are computing systems 109. These computing systems 109 may each represent a conventional computing system representing one enterprise or a complete IT centre of an enterprise.

If the cloud computing network is not operated as a public cloud, but instead as a private cloud, network 108 may not be the public Internet but a private network inside an enterprise. In this case, the computing systems 109 may denote specific computing systems for individual business units of the enterprise or for individual subsidiaries in different geographic locations of the enterprise. In the case of a private cloud, an enterprise identifier may be used as an identifier for a division or business unit of the enterprise. In the case of a public cloud, the enterprise identifier may denote the enterprise itself.

Part of the cloud information system 101, which also may be implemented in form of software, is a database. This database may store information about the cloud computing nodes 102, the cloud computing services 103, as well as information about the plurality of computing systems 109. Sub-groups of the computing systems 109 may form interest groups because they belong for example to enterprises that belong to the same vertical industry.

A user of an enterprise using one of the computers 109, using a standard I/O-devices like a keyboard and a computer screen, may decide to share information about his own company with those of other companies. He may instruct the cloud information system to collect environmental data of a computing system 109 representing an enterprise. Such environmental data sets are stored in the database of the cloud computing information system. If another user of another company also decides to share environmental data of its own computing system 109, also this information is stored in the database of the cloud computing information system. Computing systems 109 belonging to the same group may each have access to the environmental data set of other peer members in the group. It may be possible that one enterprise represented by one computing system 109, may join different groups at the same time. The information about the environmental data of the computer system 109 may vary from group to group.

Figure 2:
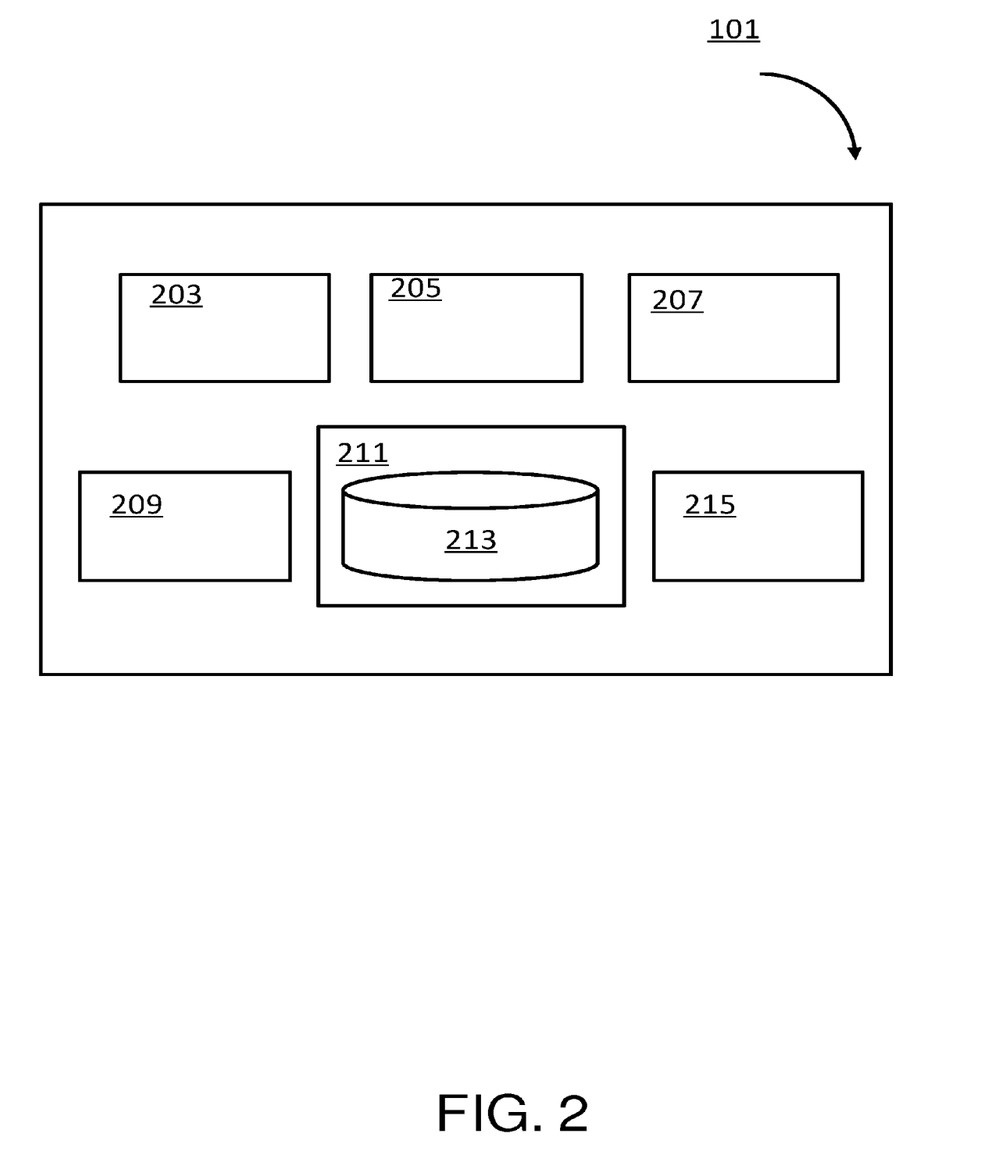
FIG. 2 illustrates an embodiment of the inventive cloud computing information system.

FIG. 2 illustrates a cloud computing information system 101. A first collection unit 203 is provided and adapted for collecting node status information, indicative of a configuration of a cloud computing node, from the cloud computing node, wherein the cloud computing node is connected to the cloud computing network. Reference numeral 205 denotes a second collection unit, which is adapted for collecting cloud service status information, which is indicative of an attribute of a cloud service being executed in a cloud computing node. These attributes have been described above already. A third collection unit 207 of the cloud information system 101 is adapted for collecting environmental data sets from a plurality of computing systems, each environmental data set corresponding to attribute values of one computing system 109, wherein the computing systems 109 are connected to the network 108, which is connected to the cloud computing network 104. The environmental data sets have been described above.

Furthermore, the cloud information system 101 comprises a group building unit 209, which is adapted for building a group of computing systems 109, wherein the group comprises computing systems 109 of the plurality of computing systems 109 with at least one identical attribute value. Such an identical attribute value may for example be the vertical industry, to which the enterprise belongs, which is operating the computing system 109. All these data collected by the first collection unit 203, the second collection unit 205, the third collection unit 207 as well as the information related to the group from the group building unit 209 is stored inside the cloud computing information system 101 in a storage unit 211, which comprises a database 213.

Furthermore, the cloud computing information system 101 comprises a selection unit 215, which is adapted for selecting characteristic data out of the node status information, the cloud service status information and the environmental data sets in the database 213 and sending the characteristic data over the cloud computing network 104 and the network 108 to the one computing system 109 of the plurality of computing systems 109 having requested the characteristic data, in response to a request for characteristic data from one computing system 109. Again, also here the computing systems 109 represent each an individual enterprise or a complete data centre of an enterprise. The selection unit 215 operates on the basis of information provided by the computer system 109 as part of the request and selects appropriate data out of the database 213 of the storage unit 211 of the cloud computing system 101. These data that correspond to the request being sent from the computer system 109, is sent by the cloud information system using conventional methods and devices via the cloud computing network 104, the interface 106 between the cloud computing network and the network 108 as well via the network 108, e.g., the Internet, back to the requesting computing system 109.

Finally, it should be noted that the above mentioned embodiments illustrate rather than limit the invention, and that those skilled in the art would be capable of designing many alternative embodiments without departing from the scope of the invention as defined by the appended claims. In the claims, any reference signs placed in parenthesis shall not be construed as limiting the claims. The word "comprising" and "comprises", and the like does not exclude the presence of elements or steps rather than those listed in any claims or the specification as a whole. A singular reference of an element does not exclude the plural reference of such elements and vice versa. In a device claim enumerating several means, several of these means may be embodied by one and the same item of software or hardware. The mere fact that the certain measures are recited in mutually different dependent claims does not indicate that a combination of these measures cannot be used to an advantage.

What is claimed is:

1. A cloud computing information system for operating cloud computing services in a cloud computing network, the cloud computing information system comprising:
- a processor;
- a memory;
- a first collection unit adapted for collecting node status information, indicative of a configuration of a cloud computing node, from the cloud computing node, wherein the cloud computing node is connected to the cloud computing network;
- a second collection unit adapted for collecting cloud service status information indicative of an attribute of a cloud computing service being executed in the cloud computing node;
- a third collection unit adapted for collecting environmental data sets from a plurality of computing systems, each environmental data set corresponding to attribute values of one of the plurality of computing systems, wherein the computing systems are connected to a network which is connected to the cloud computing network;
- a group building unit adapted for building a group of computing systems, wherein the group consists of computing systems of the plurality of computing systems with at least one identical attribute value;
- a storage unit adapted for storing the node status information, the cloud service status information, the environmental data sets, and the identical attribute value of the group in a database;
- a selection unit adapted for selecting characteristic data out of the node status information, the cloud service status information and the environmental data sets in the database and sending the characteristic data over the cloud computing network and the network to the one computing system of the plurality of computing systems having requested the characteristic data, in response to a request for characteristic data from one computing system of the group; and
- determining a number of cloud computing nodes executing a predefined version of a predefined software component, specified in configuration data of the node software stack, as part of a cloud computing service for a computing system of the group, wherein if the number exceeds a specified trigger level and if an actual version of the predefined software component is lower than the predefined version, installing the predefined version of the predefined software component on a cloud computing node, executing a cloud computing service for the computing system of the group for which the specified trigger level is defined.

2. The cloud computing information system according to claim 1, comprising additionally a user interface at one of the plurality of computing systems adapted for allowing a user action out of the group consisting of joining the group, deciding on sharing parts of one of the environmental data sets corresponding to attribute values of the one computing system of the plurality of computing systems, introducing a process of a process template library, utilizing a process of a process template library, modifying a process of a process template library, searching of group attributes, sorting and displaying of the group and group attributes based on user defined criteria.

3. The cloud computing information system according to claim 1, wherein the node status information comprises at least one out of the group consisting of node software stack data, node hardware configuration data, node usage data, node error log, node location data, node owner data, and node access statistics data.

4. The cloud computing information system according to claim 1, wherein the cloud service status information comprises at least one of the group consisting of a cloud service identifier, a cloud service version, a cloud service capabilities, cloud service usage data, cloud service error log data, cloud service provider identification, and context information, cloud service price, and an enterprise identifier, wherein the enterprise identifier corresponds to a computing system of the plurality of computing systems.

5. The cloud computing information system according to claim 1, wherein the environmental data sets comprise at least one attributes out of the group consisting of an enterprise identifier, a country identifier, a vertical industry identifier, a business unit identifier, number of employees, revenue, number of business transactions, organizational structure, storage I/O throughput, number of transactions on databases, number of end users, CPU utilization, storage consumption, error log information, attributes of processes used, hardware configuration, firmware level, software configuration, and process templates.

6. The cloud computing information system according to claim 1, further comprising, responsive to a generate-new-service-request from one computing system belonging to the group, delivering of decision support data indicative of a best match between attributes of existing cloud computing services being executed in the cloud computing node and attributes of a new cloud computing service specified by the generate-new-service-request, wherein the existing cloud computing service is used by a computing system of the group.

7. The cloud computing information system according to claim 1, wherein the specified trigger level is specified by a user of the computing system of the group for which the specified trigger level is defined.

* * * * *